United States Patent [19]

Knedlik

[11] 4,018,545
[45] Apr. 19, 1977

[54] MIX BLENDING PUMP

[76] Inventor: Omar Knedlik, 2203 Prairie Lane, Coffeyville, Kans. 67337

[22] Filed: Dec. 31, 1975

[21] Appl. No.: 645,618

Related U.S. Application Data

[63] Continuation-in-part of Ser. No. 534,871, Dec. 20, 1974, abandoned.

[52] U.S. Cl. ............................ 417/262; 417/503; 417/265; 92/129
[51] Int. Cl.² ...................... F04B 3/00; F04B 21/04
[58] Field of Search ............... 62/70, 306; 92/129; 417/298, 511, 250, 262, 251, 258, 265, 259, 503

[56] References Cited

UNITED STATES PATENTS

| | | | |
|---|---|---|---|
| 833,457 | 10/1906 | Hammond | 417/259 |
| 1,364,823 | 1/1921 | Aull | 417/503 |
| 1,653,562 | 12/1927 | Grimley | 417/259 |
| 1,858,036 | 5/1932 | Brown | 417/259 |
| 2,365,234 | 12/1944 | Wineman | 417/250 |
| 2,458,821 | 1/1949 | Anderson et al. | 417/386 |
| 2,912,935 | 11/1959 | Wier et al. | 417/387 |
| 3,023,710 | 3/1962 | Tyree, Jr. | 417/259 |
| 3,330,211 | 7/1967 | Faro et al. | 92/129 |
| 3,829,242 | 8/1974 | Duke et al. | 62/70 |

*Primary Examiner*—William L. Freeh
*Attorney, Agent, or Firm*—Cushman, Darby & Cushman

[57] ABSTRACT

A cylinder houses a slidable piston that is separated into two axially spaced portions. A rod interconnects the portions and permits lost motion between the portions when the piston is slid in either direction in the cylinder. By valving and conduits, the piston and cylinder draw quanta of air and liquid mix, for ice milk or the like, together in selected proportion, mix these together and forward them from the pump, e.g. to a freezing chamber. Means are provided, for instance the rod may be exchanged for one of another size, for varying said selected proportion. Preferably a sensor is provided to cause the pump to operate intermittently, e.g. to replenish mix which has been withdrawn from the freezing chamber. Also by preference the freezing chamber is maintained at 10–40 p.s.i.g. in order to tend to prevent reduction of overrun between the time when the air is mixed with the liquid mix and the time when the frozen confection is dispensed.

10 Claims, 3 Drawing Figures

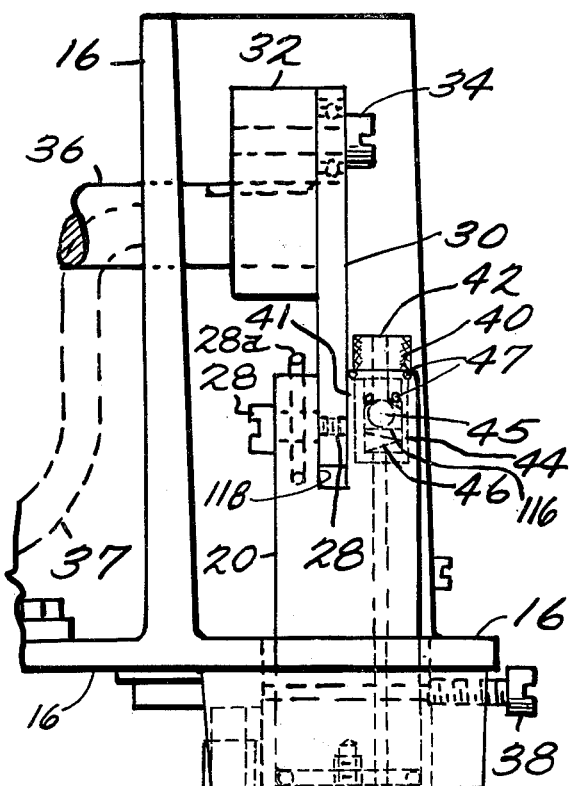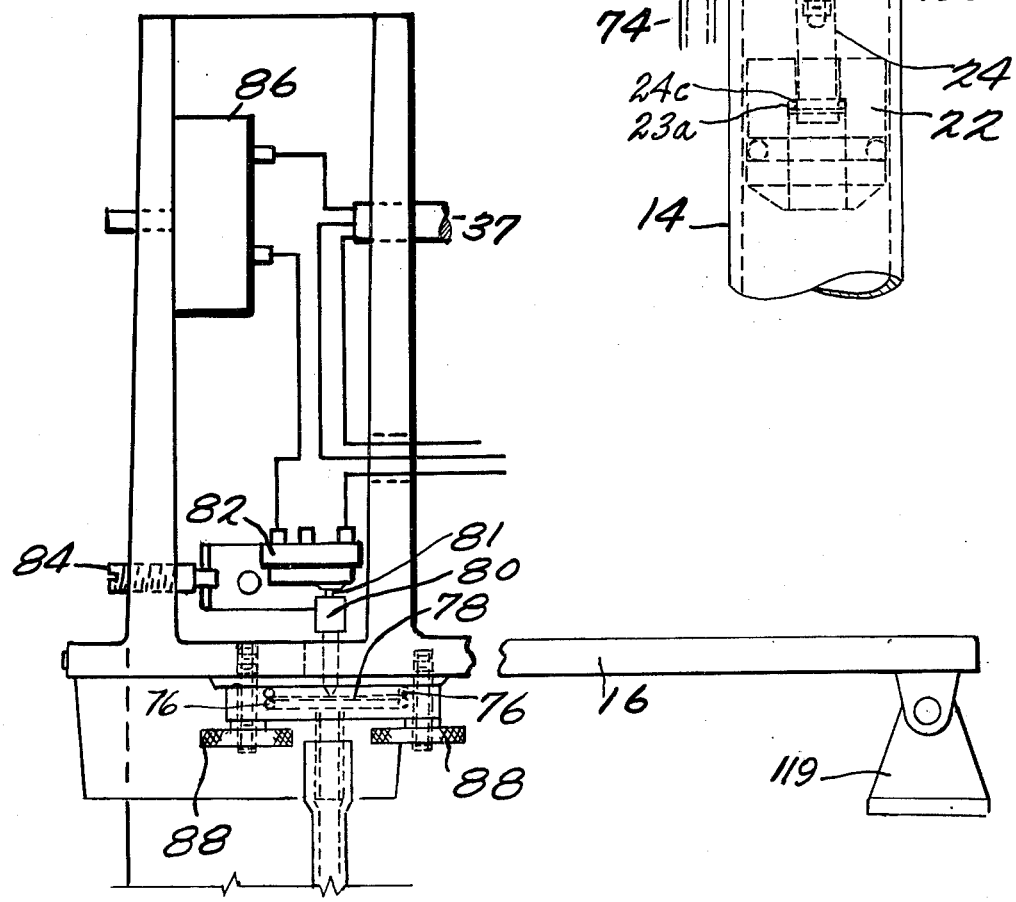

MIX BLENDING PUMP

REFERENCE TO RELATED APPLICATION

This is a continuation-in-part of my copending application Ser. No. 534,871, filed Dec. 20, 1974 and abandoned in favor hereof.

BACKGROUND OF THE INVENTION

The frozen confection which is variously known as frozen custard, soft ice cream, soft serve ice cream and ice milk is generally made in the following manner. A dairy, franchiser or other supplier manufactures a liquid mix and supplies it in bulk or in containers for refrigeration at the confection retailers. As needed, the retailer makes and dispenses the frozen confection, generally using a machine which accepts a supply of the liquid mix, directs the supply to a mixer where air is mixed with the liquid mix and forwards the air/liquid mix, i.e. a foam, through a freezer, to a dispenser. Typically the dispenser is valve-operated to dispense the frozen confection into an edible cone, a dish or another container.

The consistency, both in density and texture, of such frozen confections is substantially affected by the portion of air to liquid mix provided in the mixture that is subjected to the freezing step.

In the frozen confection trade, the proportion of air mixed in to the liquid is referred to as the "overrun." According to convention, overrun is expressed as a percentage, equal to twice the percentage of air, by volume, in the air/liquid mixture. As an example, an air/liquid mix having a 50 percent overrun includes 33 1/3 percent air and 66 2/3 percent liquid mix, by volume.

Although each freezing machine generally has the percentage overrun for its pump set at a constant value when the machine is first installed, this assumes that the machine will always use the same recipe of liquid mix. However, different recipes can call for different overruns and the seller's conception of what consistency of the public wants in a frozen confection varies from store to store and locality to locality.

For these reasons, manufacturers of the freezing machines and of the pumps therefore desire to provide a means by which one design of pump can by selection or minor servicing provide any of several amounts of overrun.

One problem which must be taken into account is that health regulations in most localities require that all parts of the freezing machine that come in contact with the liquid mix, before, during and after freezing, be disassembled from the machine frequently and thoroughly cleaned.

Accordingly, a good design of pump is one which minimises the need for and facilitates cleaning and permits the desired level of overrun to be maintained during use in spite of frequent disassembly and reassembly of the pump.

The present inventor believes that prior available devices are not fully satisfactory and accordingly has designed what he considers to be an improved mix blending pump.

SUMMARY OF THE INVENTION

A cylinder houses a slidable piston that is separated into two axially spaced portions. A rod interconnects the portions and permits lost motion between the portions when the piston is slid in one direction in the cylinder. By valving and conduits, the piston and cylinder draw quanta of air and liquid mix, for ice milk or the like, together in selected proportion, mix these together and forward them from the pump, e.g. to a freezing chamber. Means are provided, for instance the rod may be exchanged for one of another size, for varying said selected proportion. Preferably a sensor is provided to cause the pump to operate intermittantly, e.g. to replenish mix which has been withdrawn from the freezing chamber. Also by preference the freezing chamber is maintained at 10-40 p.s.i.g. in order to tend to prevent reduction of overrun between the time when the air is mixed with the liquid mix and the time when the frozen confection is dispensed.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

FIG. 2 is a fragmentary elevation view from the aspect of line 2—2 of FIG. 1, with some parts broken away and sectioned to expose interior details; and FIG. 3 is a fragmentary elevation view from the aspect of line 3—3 of FIG. 1, with some parts broken away and sectioned to expose interior details.

DETAILED DESCRIPTION OF A PRESENTLY PREFERRED EMBODIMENT OF THE INVENTION

Figure 1:
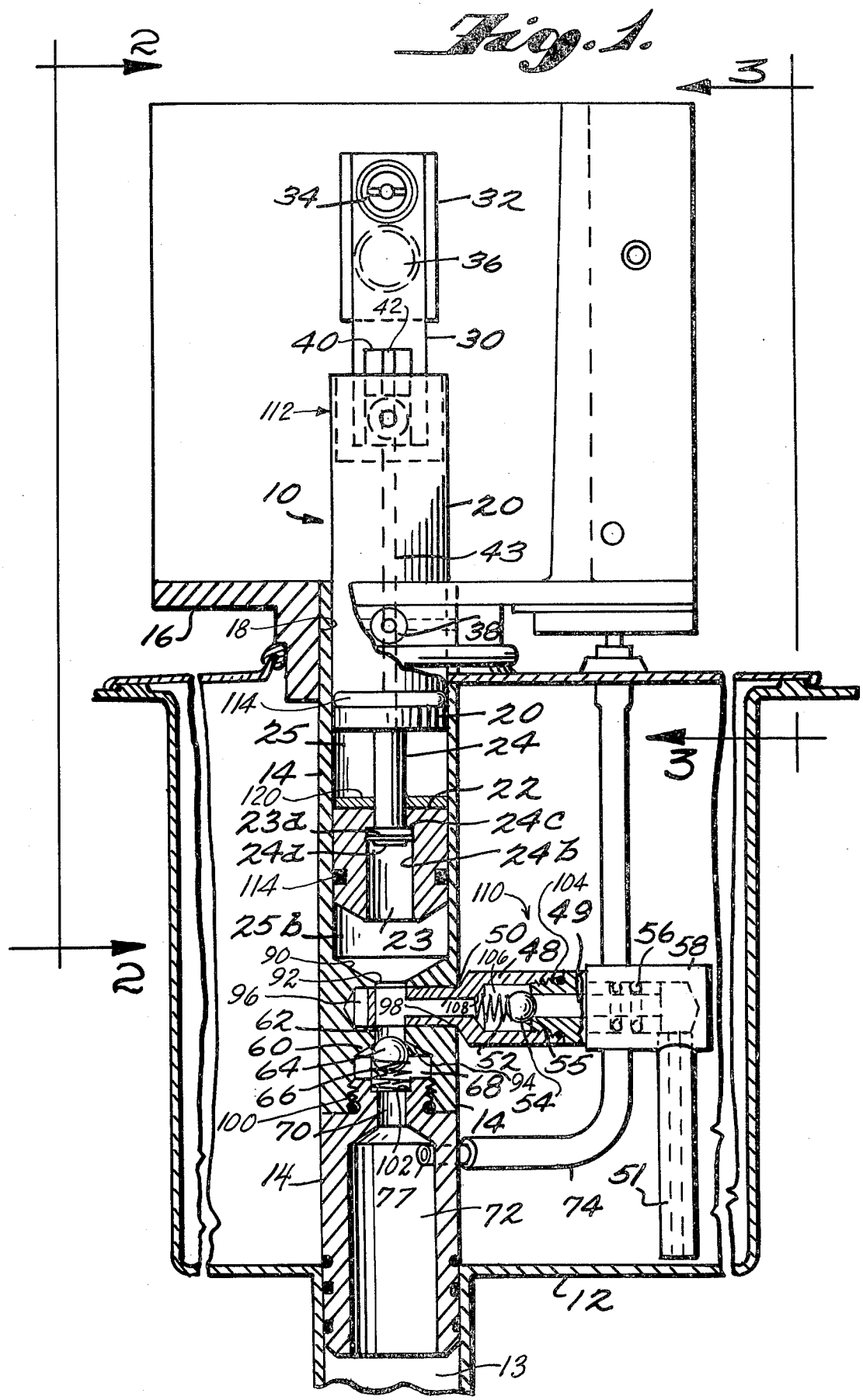
FIG. 1 is a longitudinal sectional view of a freezing machine mix pan provided with a mix blending pump in accordance wih the principles of the present invention.

In general, the function of the mix blending pump 10, is to draw air in at 42 and draw liquid mix in at 51, mix these quanta together at 25b and send the air/liquid mix mixture down through the valve 60 to a freezing chamber (that is out of sight below FIG. 1). The pump 10 is operated intermittantly by a shaft 36 intermittantly turned by a motor (that is out of sight to the left of FIG. 2). The motor is caused to operate when the pressure downstream from the valve 60, as monitored at 77, drops below a selected threshold value due to the dispensing of frozen confection downstream from the freezing chamber.

The frozen confection making apparatus includes a mix pan 12 which functions as a reservoir or sump for liquid mix, before air is mixed into the liquid mix. The pan 12 has an outlet 13 at the bottom. (As explained later, the pump fits in this outlet, so air/liquid mix mixture, not just liquid mix, goes out this outlet.) The mix pan 12 has an inlet or cover flap not shown, through which liquid mix is admitted to the mix pan 12.

Mix blend pump 10 is removably mounted to the freezing machine structure by a suitable hinged bracket (119) at the rear of frame 16.

The mix blending pump 10 includes a tubular casing or cylinder 14 which has its lower end sealingly socketed in the mix pan outlet 13, and its upper end fit into the opening 18. A screw 38 threaded laterally through the frame 16 engages the exterior of the upper end region of the cylinder 14 to removably secure the frame 16 and cylinder 14 together.

Within the bore thereof, the cylinder 14 is shown provided with an upwardly facing tapered annular seat 90 defining a port 92. Spaced below that is a similar, downwardly facing tapered annular seat 94 defining a port 60. Between the ports 92 and 60 is a chamber 96 which opens radially through the cylinder wall at 98. Below the seat 90, the casing 14 has a threaded, sealed connection at 100, which permits the casing to be easily disassembled for cleaning.

An expansion chamber 68 is provided between the seat 94 and the connection 100. Below the connection 100, the port 70 leads down through the lower end of the cylinder 14 to supply air/liquid mix mixture through the outlet 13 to the freezing chamber.

In the lower end region of the casing 14, a laterally projecting tubular pressure tap 77 extends into the mix pan interior from the bore of the casing. (As explained later, a pressure sensing tube 74 is removably fit on the tap 77 and connected with the pressure responsive controls that are shown in FIG. 3, in order to operate the pump 10 whenever the sensed pressure drops below a chosen theshold value.)

A ball 64 is held normally seated against the seat 94 by a spring 66 which bears on a shoulder 102 below the connection 100. Accordingly when a disassembly is effected at 100, the chamber 68 is opened and the ball 64 and spring 66 are accessable for cleaning.

A tubular liquid mixing port assembly 48 has an inward extension portion 50 secured in the lateral opening 98 and extends outwards into the mix pan. At the outer end of the assembly 48, an elbow fitting 58 is removably slid onto the assembly 48 and sealed with respect thereto by O-rings 56. A tubular intake 51 extends from the opposite leg of the elbow down to near the bottom of the mix pan.

The assembly 48 has a sealed, threaded connection at 104 which permits disassembly for cleaning. Between the connection 104 and the extension 50, there is defined an annular seat 55 which faces the casing 14. The seat 55 is within a chamber 106 in the bore 49. A ball 54 received in the chamber is normally held against the seat by a spring 52 shouldered at 108 to provide a normally closed check valve 110.

Above the upwardly facing seat 90, the bore of the casing 14 is smooth all the way to the upper end of the casing 14, for receipt of a vertically reciprocable piston assembly 112. The piston assembly 112 includes a cylinder upper, primary portion 20 and a cylindrical lower, secondary portion 22. Each portion 20, 22 has a piston ring 114 for sealing with the bore of the casing 14.

A threaded stud 26 has an upper end portion embedded in the primary piston and extends coaxially downwards therefrom. A spacer rod 24 is provided with an internally threaded socket in its upper end which permits the rod 24 to be removably threadably secured on the stud 26.

The rod 24 has an enlarged lower end which provides a valve disk, enlargement or flared end 24a.

The secondary piston 22 has a vertical bore 24b which is reduced in diameter intermediate the height of the secondary piston 22 to provide a downwardly facing annular shoulder 24c. The rod 24 has an O-ring 23a mounted in an outwardly opening groove just behind the enlargement 24a. The bore 24b is somewhat oversize with respect to the diameter of the rod 24, so that fluid may flow through the annulus between the bore 24b and the rod 24, except when the rod 24 head 24a is pulled upwards relative to the secondary piston 22 sufficiently to seal the O-ring 23a against the seat 24c.

Notice now that the locations of the primary and secondary pistons defines, with the bore of the casing 14, an upper chamber 25 between the primary and secondary pistons 20, 22 and a lower chamber 25b between the secondary piston 22 and the seat 90.

(As explained later, the volume of upper chamber 25 relative to the total volume of upper chamber 25 plus lower chamber 25b, determines the percent overrun provided by operating the pump 10. Accordingly, the overrun can be decreased by replacing the rod 24 that is shown with one just like it, but axially shorter and the overrun can be increased by replacing the shown rod 24 with one just like it, but axially longer.)

The primary piston 20 extends upwards out of the upper end of the casing 14.

Laterally offset from the axial centerline thereof, the primary piston 20 is provided with a vertical passageway 43. A normally closed check valve 44 is interposed in the outer end of the passageway 43. A screw 40 is removably threaded into the outer end of the passageway 43 and seals via on an O-ring 47 with the passageway 43. The screw 40 has a throughbore 42 which provides an air inlet port. Within the enlarged chamber 116 in the bore 43, below the screw 40, a spring 46 normally urges a ball 45 against where the bore 42 emerges through the lower end of the screw 40, thus providing the normally closed check valve 44. Removal of the screw 40 permits access to the valve parts for cleaning.

Now that the valving has been described, the means for causing the piston assembly 112 to be vertically reciprocated will be explained in more detail.

An upwardly opening slot 118 is formed in the upper end of the primary piston 20. The lower end of an arm 30 is received in the slot 118. The slot 118 includes a laterally open portion which laterally receives a lateral pivot pin 28 secured to the arm 30 and a lock pin 28a is slid vertically down into a socket in the upper end of the primary piston 20 to block off that laterally open slot portion, so that the arm 30 can pivot about the pin 28. Removal of the pin 28a will permit the arm 30 to be slid laterally out of the slot 118 for disassembly. At its upper end, the arm 30 is rotatably secured to a crank 32 via a crank pin 34. The crank is secured on a rotatable shaft 36 for rotation. Accordingly, as the shaft 30 is rotated, the upper end of the arm is rotated in a circle whose radius is provided by the axial offset of the crank pin 34 from the shaft 36 and the lower end of the crank is correspondingly raised and lowered as it rocks about the pin 28. The shaft 36 is rotated by a motor (not shown).

The preferred motor control system is shown in FIG. 3.

As previously described, the pressure tap 77 is fitted with a tube 74. Tube 74 is connected by means of O-ring diaphragm seals 76 and diaphragm bellows 78 to a plunger 80. Plunger 80 is arranged against a microswitch 82 to regulate operation of mix blend pump 10. The ranges of operation can be regulated by adjusting a cam screw 84. Power cable 37 is operatively connected to a circuit breaker 86 by means of wire leads which are in turn connected to micro-switch 82 and subsequently to the motor. Thumb screws 88 are used to secure the diaphragm bellows having frame 16.

Tube 74 directly senses the pressure in the freezing chamber. When the frozen confection made from the air/liquid mix mixture is withdrawn from the freezing chamber, there is a corresponding decrease in pressure in the discharge tube 72 portion of the casing 14. The pressure drop caused by the reduction of mass in freezing chamber is transmitted through tube 74 to diaphragm bellows 78. Diaphragm bellows 78 is connected to plunger 80, so that when a decrease in pressure occurs, plunger 80 is moved out of contact with contact 81 to thereby actuate the motor for running the pump. The pump will continue to operate until the pressure in freezing chamber reaches a predetermined value, whereupon bellows 78 urges plunger 80 against contact 81 to deactivate switch 82 and stop the motor.

It should be realized that various modifications may be made without departing from the principles set forth herein.

As one instance, for the various screw threaded connections illustrated can be replaced with bayonnet or other telescoping sealed connections or the like.

As another, the volume of chamber 25 relative to the volume of chamber 25 plus chamber 25b can be varied in other ways than replacing the rod 24 with one which is longer or shorter. For instance the rod 24 can be replaced with one of lesser outer diameter, one or more washer-shaped spacers may be installed as suggested at 120, or the secondary piston 22 may be replaced with a similar one whose shoulder 24c is closer to or further from its upper end surface. In any of these events, the pump 10 requires only partial disassembly to change the ratio of the two volumes. The pump is designed for quick and simple disassembly and assembly, as its usage requires daily cleaning. Normally, any required proportion changes are made at this time, by changing to a wider or narrower collar or exchange of the secondary piston provided with a more suitable bore depth. On rare occasions it is necessary to change the fluid volume ratio during the time when the pump is in use. This is accomplished easily by removing pin 28a and slidably disconnecting the connecting rod 30 and pivot pin 28 from the primary piston 20, unscrewing bolt or screw 38 and removing the power drive element with the frame 16, leaving the pump assembly in place in the mix pan. The piston assembly can now be lifted out of the cylinder without removing the cylinder. Adjustments can be made to the fluid volume ratio either by changing the collar 24 or changing the piston 22 to accomplish the necessary ratio adjustment. The piston assembly is then reinserted into the cylinder, the power element is set in place and the connecting rod reconnected. The pump is now ready to resume operation at a new ratio. This can all be done without removing the mix from the mix pan, or disturbing the pressure or contents in the freezing chamber.

The ball check valves described and illustrated, or any of them, may be replaced with equivalent check valves of other known sorts.

In general, the pumping system works as follows. The piston assembly is shown at the top of its stroke in FIG. 1. In normal operation, when the piston assembly is at the top of its stroke, the upper chamber 25 is filled with air which has been drawn in at 42, 43 through valve 44 and the lower chamber 25b is filled with liquid mix which has been drawn in at 51, 58, 49, 50 through the valve 54, 55. As the shaft 36 rotates, the crank 32 moves the arm 30 downwards, pushing the primary piston 20 downwards. The rod 24 moves downwards with the primary piston, opening up the annular passage between the bore 24b and shoulder 24c on the one hand and the enlargement 24a and seal 23a on the other. This measured quantum of air is thus forced into the lower chamber 24b where it mixes with the liquid mix. Continued downward movement causes the primary piston to bottom on the upper end of the secondary piston or on the annular spacer 120 which rests on the upper end of the secondary piston. Further downward movement so pressurizes the air/liquid mix mixture, that the check valve 60 opens, sending the quantum of air/liquid mix mixture out the discharge tube 72 and on to the freezing chamber.

As the piston assembly begins its up-stroke, the operation of the valve between the two working chambers 25 and 25b is only necessary on the intake stroke of the secondary piston 22. At the beginning of the up (intake) stroke both upper 25 and lower 25b chambers are closed, and only the primary piston 20 and the rod 24 move, creating the chamber 25 between the primary 20 and the secondary 22 pistons. This chamber 25 is filled with air drawn through the check valve 40 on the exposed end of the primary piston 20. The spring 46 load on the air check is balanced slightly more than atmospheric pressure, permitting it to open on a slight differential pressure which is formed as the volume of the upper chamber 25 is increased. The closed discharge valve 60 in conjunction with the friction produced by contact of the O-ring, on the secondary piston 22, against the casing 14 wall plus the greater viscosity and weight of the liquid mix as compared to air and the spring 52 load against ball 54 prevents both the secondary piston 22 being drawn up and the liquid mix being introduced into the upper chamber 25 through bore 24b until the primary piston 20 and the rod 24 are high enough that the O-ring 23a on the flared end of the rod 24 seals against the seat formed by the ledge 24c in the bore 24b in the secondary piston 22. At this point the upper chamber 25 is sealed off from the lower chamber preventing air from being drawn into the lower chamber 25b as the chamber 25b is being formed by the secondary piston 22 upward movement for the balance of the intake stroke. The void formed by the opening of the lower chamber 25b is filled by fluid drawn through the fluid entrance intake check valve 48. On the start of the down (exhaust) stroke the O-ring 48 seal in the secondary piston 22 is immediately opened and the air in the upper chamber 25 is exhausted into the lower chamber 25b through the passage way between the rod 24 shank and the secondary piston 22. This passage way exists since the hole through the secondary piston 22 is larger than the rod 24 shank. Air from the upper chamber 25 and fluid from the lower chamber 25b are exhausted simultaneously through the discharge port 62, the check assembly 60, and the air intake valve assembly 40 preventing back flow through their respective entrance ports 50 and 43, until completion of the down stroke, at which time both upper 25 and lower chambers 25b are closed and air and fluid have been displaced out through the exhaust port 62. The cycle is now completed and a new cycle started immediately on the upstroke.

It should now be apparent that the mix blending pump as described hereinabove, possesses each of the attributes set forth in the specification under the heading "Summary of the Invention" hereinbefore. Because the mix blending pump can be modified to some extent without departing from the principles of the invention as they have been outlined and explained in this specification, the present invention should be understood as encompassing all such modifications as are within the spirit and scope of the following claims.

What is claimed is:

1. A mix blending pump for introducing a predetermined amount of air into a liquid mix comprising:
   a. a first piston means slidably disposed within a casing;
   b. means for reciprocating said first piston means through an upstroke and downstroke in said casing;
   c. a second piston means slidably disposed within said casing and slidably connected to said first piston means to define a first chamber therebetween;
   d. means for admitting air into said first chamber;
   e. means for admitting liquid mix into a second chamber disposed adjacent to said second piston means;
   f. a connecting rod being secured to said first piston means and slidably arranged in a bore in said second piston means;
   g. said bore being further provided with abutment means for limiting the distance between said first and second piston means during the upstroke of said first piston means;
   said connecting rod being arranged to enable said first piston means to contact said second piston means at a lowermost portion of said downstroke to further displace said second piston means downwardly in said casing to force the air-liquid mixture from said second chamber;
   said connecting rod being provided with adjustable means for selectively changing the distance between said first and second piston means at the top of the upstroke to thereby control the amount of air introduced into said first chamber and correspondingly control the amount of air introduced into the liquid mix;
   said adjustable means comprising an additional rod secured to said connecting rod and threadedly secured to said first piston means;
   said first piston means drawing a predetermined amount of air through said air admitting means into said first chamber and said second piston means drawing a predetermined amount of liquid mix through said liquid admitting means into said chamber during the upstroke, said first piston means displacing air from said first chamber through at least one port in said second piston means into said second chamber during the downstroke to thereby introduce a predetermined amount of air into the liquid mix.

2. A mix blending pump as described in claim 1 wherein said air admitting means comprises a valve disposed on said first piston means arranged to permit the introduction of air into said first chamber during the upstroke and further arranged to prevent the introduction of air into said first chamber during the downstroke.

3. A mix blending pump as described in claim 2 wherein said liquid admitting means comprises a valve disposed adjacent to said second chamber arranged to permit the introduction of liquid mix into said second chamber during the upstroke and further arranged to prevent the introduction of liquid mix the downstroke of said first piston means.

4. A mix blending pump as described in claim 3 wherein a discharge valve assembly is provided in a discharge port leading from said second chamber arranged to permit the passage of an air-liquid mixture from said second chamber through said port during the downstroke and also arranged to provide a seal between said second chamber and said discharge port during the upstroke of said first piston means.

5. A mix blending pump as described in claim 4 wherein said casing is mounted adjacent to a mix pan and said discharge port leads to a pressurized freezing chamber.

6. A mix blending pump as described in claim 5 wherein said freezing chamber is maintained at a pressure in the range of about 10–40 psi.

7. A mix blending pump system,
   for a frozen confection-making machine having wall means defining a reservoir for a supply of cold liquid mix which is to be mixed with air and frozen to produce the confection, which reservoir has an outlet through the wall means thereof to a freezing chamber,
   said mix blending pump system, including:
   a pump, comprising:
   a generally vertically oriented cylindrical casing having a lower end region sized to sealingly fit in the outlet, as a discharge tube, with the remainder of the casing extending upwardly to above the level to which the reservoir is normally filled with the cold liquid mix;
   a piston assembly slidingly received in the casing, the piston assembly including an upper, primary piston, a lower, secondary piston and a lost motion element interconnecting the primary and secondary pistons, permitting the primary piston to move toward adjacency with the secondary piston as the primary piston is urged downwards, and permitting the primary piston to move to a predetermined distance away from the secondary piston, limited by full extension of the lost motion element;
   an upper chamber being defined in the casing between the primary and secondary pistons, and a lower chamber being defined in said casing under the secondary piston;
   an air outlet conduit communicating through the primary piston between the upper chamber and the exterior of the primary piston at a level above said normal reservoir liquid mix filling level;
   a first check valve interposed in said air inlet conduit in such orientation that the first check valve opens only to admit air through said air inlet conduit into the upper chamber as the primary piston is being urged upwards and the lost motion element is in the act of extending fully between the primary and secondary pistons, so that the upper chamber is increasing in volume;
   a liquid mix inlet conduit communicating through the casing between the lower chamber and the exterior of the casing at a level said normal reservoir liquid mix filling level;
   a second check valve interposed in the liquid mix inlet conduit in such orientation that the second check valve opens only to admit liquid mix through said liquid mix inlet conduit into the lower chamber as the secondary piston is being urged upwards when the primary piston has been urged upwards sufficiently far that the lost motion element is fully extended so that further upward urging of the primary piston causes the secondary piston to be correspondingly urged upwards;
   a conduit communicating between the upper and lower chambers;
   a check valve interposed in the last-mentioned conduit and having an actuator sensitive to the attainment of full extension of the lost motion element, to open only when the lost motion element is less than fully extended, to permit the quantum of air which was drawn into the upper chamber while the primary piston was being urged upwardly, to pass through the last-mentioned conduit and mix with the quanta of liquid mix which was drawn into lower chamber while the secondary piston was being urged upwardly, when the primary piston is urged downwards and toward the secondary piston; and a fourth check valve interposed in said casing between the lower chamber and the discharge tube in such orientation that the fourth check valve opens only to release said mixture of air and liquid mix from the pump through the discharge tube, when the primary piston has been urged downwardly sufficiently to fully consume the lost motion provided by the lost motion element and begin to urge the secondary piston downwardly thereby decreasing the volume of the lower chamber.

8. The mix blending pump system of claim 7,
wherein said last mentioned conduit proceeds axially through the secondary piston and is enlarged intermediate the length to provide a downwardly facing shoulder;
wherein the lost motion element comprises a rod secured to the primary piston and extending axially downwardly therefrom through the upper chamber and into said conduit of the secondary piston, and wherein the third check valve comprises an enlarged head on the rod, within the conduit of the secondary piston, for seating against said downwardly facing shoulder.

9. The mix blending pump system of claim 8,
further including an annular, washer-shaped element interposed between the primary and secondary pistons and about said rod, for relatively reducing the largest volume of the upper chamber compared to the sum of the largest volume of the upper chamber and the largest volume of the lower chamber, for correspondingly reducing the amount of overrun of the air and liquid mix mixture provided by the pump out through the discharge tube thereof, compared to the amount of overrun which would be provided in the absence of the annular, washer-shaped element.

10. The mix blending pump system of claim 8, further including disconnectable connector means disconnectably connecting the rod to the primary piston, whereby the rod or secondary piston may be easily replaced with one of another size, to correspondingly vary the amount of overrun of the air and liquid mix mixture provided by the pump out through the discharge tube thereof, compared to the amount of overrun which would be provided with the first-described rod or secondary piston installed.

* * * * *